(12) United States Patent
Buck

(10) Patent No.: US 12,553,413 B2
(45) Date of Patent: Feb. 17, 2026

(54) WIND TURBINE BLADE AND WIND TURBINE

(71) Applicant: Siemens Gamesa Renewable Energy A/S, Brande (DK)

(72) Inventor: Steven Buck, Denver, CO (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/102,984

(22) Filed: Jan. 30, 2023

(65) Prior Publication Data

US 2024/0254965 A1 Aug. 1, 2024

(51) Int. Cl.
*F03D 7/02* (2006.01)
*F03D 7/04* (2006.01)

(52) U.S. Cl.
CPC ......... *F03D 7/0296* (2013.01); *F03D 7/0236* (2013.01); *F03D 7/042* (2013.01); *F05B 2240/221* (2013.01); *F05B 2260/962* (2013.01)

(58) Field of Classification Search
CPC .... F03D 7/0296; F03D 7/0236; F03D 1/0633; F03D 1/0675; F05B 2260/962; F05B 2270/333; B64C 27/46; B64C 27/467; B64C 27/473; B64C 2230/02
See application file for complete search history.

(56) References Cited

U.S. PATENT DOCUMENTS

| | | | |
|---|---|---|---|
| 6,092,990 A * | 7/2000 | Hassan | B64C 27/51 416/42 |
| 6,457,654 B1 * | 10/2002 | Glezer | B64G 1/40 257/E23.093 |
| 7,823,839 B2 * | 11/2010 | Glezer | F15D 1/12 244/204.1 |
| 8,047,783 B2 * | 11/2011 | Nies | F03D 80/55 416/1 |
| 8,876,064 B2 * | 11/2014 | Seifert | B64C 21/025 244/209 |
| 9,841,002 B2 * | 12/2017 | Oerlemans | F03D 1/0608 |
| 10,502,187 B2 * | 12/2019 | Enevoldsen | F03D 7/0296 |
| 11,428,207 B2 * | 8/2022 | Egedal | F03D 17/00 |
| 2007/0029403 A1 * | 2/2007 | Hassan | B64C 15/14 169/53 |
| 2010/0140416 A1 * | 6/2010 | Ohanian, III | B64U 30/26 244/23 A |
| 2010/0266382 A1 * | 10/2010 | Campe | F03D 1/0608 290/55 |

(Continued)

FOREIGN PATENT DOCUMENTS

| | | | | |
|---|---|---|---|---|
| DE | 60004492 T2 * | 6/2004 | | B64C 23/005 |
| EP | 2851556 A1 * | 3/2015 | | F03D 1/0608 |
| EP | 3249216 A1 | 11/2017 | | |

*Primary Examiner* — Justin D Seabe

(74) *Attorney, Agent, or Firm* — Schmeiser, Olsen & Watts LLP

(57) ABSTRACT

A wind turbine blade, comprising a sensor device for detecting properties of flow-induced noise produced by the blade and an actuator device for emitting an anti-noise signal for at least partially cancelling out the flow-induced noise, wherein the actuator device comprises an aerodynamically shaped housing attached to an outer surface of the blade. The aerodynamically shaped housing of the actuator device reduces a deterioration the aerodynamic efficiency of the blade. Further, the generation of turbulences at sharp edges of the housing is avoided.

16 Claims, 4 Drawing Sheets

(56) References Cited

U.S. PATENT DOCUMENTS

| | | | |
|---|---|---|---|
| 2012/0298769 A1* | 11/2012 | Heffington | F02K 1/28 |
| | | | 239/102.1 |
| 2014/0301864 A1* | 10/2014 | Singh | F03D 1/0675 |
| | | | 416/90 R |
| 2017/0045031 A1* | 2/2017 | Asheim | F03D 1/0633 |
| 2021/0251213 A1* | 8/2021 | Carter | G10K 9/122 |
| 2022/0010774 A1* | 1/2022 | Asheim | F03D 1/0633 |

* cited by examiner

WIND TURBINE BLADE AND WIND TURBINE

FIELD OF TECHNOLOGY

The disclosed relates to a wind turbine blade and a wind turbine.

BACKGROUND

Wind turbine blades are known to generate noise due to a flow of air along the blades outer surface. Noise is predominantly generated at blade edges such as the trailing edge of the blade (so-called trailing edge noise). The intensity and the frequency of the noise depend on the properties of the blade such as the shape of the blade edges and the properties of the air flow.

Noise generated by rotating rotor blades of an onshore wind turbine are perceived as nuisance by people in the vicinity of the wind turbine. Further, there exist various legal provisions and restrictions regarding the allowed noise level of a wind turbine. Known approaches to reduce the flow-induced edge noise of wind turbine blades include improved designs of the airfoil of the blade and, in particular, the trailing edge of the blade. For example, aerodynamic add-ons may be arranged at the blade such as serrated panels mounted to the pressure side or suction side of the blade close to its trailing edge. Further, in EP 3 249 216 A1, active noise cancellation of flow-induced trailing edge noise is proposed.

SUMMARY

It is one aspect of the embodiments to provide an improved wind turbine blade.

Accordingly, a wind turbine blade is provided. The wind turbine blade comprises a sensor device for detecting properties of flow-induced noise produced by the blade and an actuator device for emitting an anti-noise signal for at least partially cancelling out the flow-induced noise. Further, the actuator device comprises an aerodynamically shaped housing attached to an outer surface of the blade.

With the sensor device and the actuator device, noise produced by the blade, such as flow-induced trailing edge noise, can be actively suppressed. For example, the sensor device is configured for detecting unsteady flow properties related to flow-induced noise produced by the blade. Further, the anti-noise signal is, for example, generated by the actuator device based on the properties of the flow-induced noise, e.g., the unsteady flow properties, detected by the sensor device such that the anti-noise signal destructively interferes with the emitted noise. In this manner, the noise produced by the blade can be at least partially cancelled. Hence, a noise emission from the wind turbine can be reduced.

Moreover, the actuator device, i.e. the housing of the actuator device, is advantageously attached to the outer surface of the blade. Hence, in contrast to an arrangement of the actuator device inside the blade, holes in the blade shell can be avoided.

Further, since the housing of the actuator device is aerodynamically shaped, the aerodynamic impact of the actuator device on the blade is minimized. In particular, an impact of the housing on the aerodynamic efficiency of the blade and, therefore, the energy production of the wind turbine is reduced. Further, due to the aerodynamic configuration of the housing in which sharp edges are avoided, the generation of vortices, aerodynamic drag, and noise at edges of the housing are substantially mitigated.

The wind turbine blade is part of a rotor of a wind turbine. The wind turbine is an apparatus to convert the wind's kinetic energy into electrical energy. The wind turbine comprises, for example, the rotor having one or more of the blades connected each to a hub, a nacelle including a generator, and a tower holding, at its top end, the nacelle. The tower of the wind turbine may be connected via a transition piece to a foundation of the wind turbine, such as a monopile in the seabed or a concrete foundation. The wind turbine is, for example, an onshore wind turbine. However, the wind turbine may also be an offshore wind turbine.

The wind turbine blade, e.g., its root section, is configured for being fixedly or rotatably connected to the hub. Apart from the (cylindrical) root section, the wind turbine blade is formed aerodynamically. The wind turbine blade comprises, in particular, a pressure side and a suction side. The pressure side and the suction side are connected with each other at a leading edge and a trailing edge. The pressure and suction sides and the leading and trailing edges define, as seen in cross-section, an airfoil of the wind turbine blade (blade airfoil).

The wind turbine blade comprises a shell made, for example, from a fiber-reinforced laminate. The shell defines an outer shape of the blade. The shell comprises, for example, a suction side shell and a pressure side shell arranged at the suction side and the pressure side of the blade, respectively.

The housing of the actuator device is, for example, attached to the suction side (e.g., the suction side shell) of the blade. However, the housing of the actuator device may, for example, also be attached to the pressure side (e.g., the pressure side shell) of the blade.

The housing of the actuator device is, for example, attached to the outer surface of the blade by means of an adhesive. Using an adhesive for attachment avoids any intrusion into the blade structure. The housing of the actuator device could, however, also be attached by means of bolts and corresponding threaded holes in the blade structure. Alternatively, the housing could be installed into the blade structure by direct inclusion in an outer layer of the blade structural material, for example fiber-reinforced laminate.

The sensor device configured for detecting properties of flow-induced noise produced by the blade is, for example, also attached to an outer surface of the blade (e.g., to the suction side and/or the pressure side of the blade). The sensor device is, for example, configured to detect flow characteristics of a fluid (e.g., air) flowing around the blade. The sensor device is, for example, configured to characterize a turbulence in an aerodynamic boundary layer.

The sensor device comprises, for example, one or more sensor units capable to detect the flow characteristics of the fluid passing by the respective sensor unit. The sensor device and/or each of the one or more sensor units comprise, for example, a diaphragm (e.g., membrane) and/or a microphone. In the simplest form, the sensor device and/or a respective sensor unit may include just a small opening in a surface thereof which is used to sense a fluctuating surface pressure induced by the fluid passing by the opening.

By means of the actuator device, flow-induced noise (e.g., flow-induced edge noise) from the rotor blade is reduced or eliminated. This is achieved by the use of anti-noise. Usually, flow-induced edge noise is a broadband noise source caused by a turbulent flow. Hence, the edge noise is random, i.e. stochastic. Further, the related acoustic pressure fluctuations are non-deterministic. Hence, the acoustic pressure fluctuations cannot be predicted in a temporal sense on the basis of the current or previous acoustic signals, even when the statistical properties are known.

However, it was demonstrated that the unsteady surface pressure pattern that generates the noise (e.g., sound at the edge) can in an approximation be considered to convect unchanged with the flow along the suction side or pressure side (i.e. along the chord) of the blade. This assumption is referred to as the "frozen turbulence" assumption in the literature. In the present embodiments, this fact is used to detect the unsteady surface pressure pattern upstream of the edge so that a noise cancelling anti-noise signal can be constructed and emitted to create at least partial noise cancellation of the trailing edge noise in at least one observer location or in at least one observer directions.

The actuator device includes, for example, one or more actuator units for producing the anti-noise signal. The actuator device includes, for example, two, three or four actuator units. The actuator device may, however, also include more than four actuator units. The actuator device and/or the one or more actuator units are capable to transform an electrical signal into a mechanical movement. The actuator device and/or the one or more actuator units include, for example, at least one diaphragm (membrane) and/or a loudspeaker and/or a morphing surface for generating the anti-noise signal. A surface of a diaphragm of the actuator device is, for example, exposed at the housing to emit the anti-noise signal. The actuator device and/or the one or more actuator units further comprise, for example, means to move the respective diaphragm.

The anti-noise signal generated and emitted by the actuator device is, for example, a sound signal used to superimpose it onto the noise signal produced by the blade such that a destructive interference occurs. By the destructive interference, the noise produced by the blade is mitigated.

Further, the actuator device is, for example, connected (wired or wireless) with the sensor device for data transfer (e.g., for transfer of the detected noise signal from the sensor device to the actuator device).

The wind turbine blade may comprise, for example, a control unit for generating a control signal to control the actuator device to emit the anti-noise signal. The control unit is, for example, configured for generating said control signal based on the noise signal detected by the sensor device. The control unit is, for example, configured for receiving the detected noise signal from the sensor device. Furthermore, both the actuator device and the sensor device are, for example, connected (wired or wireless) with the control unit for data transfer. For example, the actuator device may be connected with the sensor device via the control unit for data transfer.

Using a control unit to generate the anti-noise signal has the advantage that a more optimized and tailored anti-noise signal may be produced and that the elimination of the flow induced noise may possibly be achieved in a larger extent. Such a control unit is, for example, arranged—instead of on an outer surface of the blade—inside the nacelle, tower, tower base and/or rotor blade. This has the advantage that it does not disturb the fluid flow flowing across the rotor blade and that it is protected from ambient conditions such as weather conditions.

Further details on the detection of the properties of the flow-induced noise by the sensor device and the generation of the anti-noise signal by the actuator device can be found in EP 3 249 216 A1, the content of which is incorporated herein by reference.

In embodiments, the actuator device comprises at least one gas chamber accommodated inside the housing for increasing a radiation efficiency.

According to an embodiment, the actuator device comprises:
at least one diaphragm exposed at an outer surface of the housing for converting kinetic energy into acoustic energy for generating the anti-noise signal, and
at least one gas chamber accommodated inside the housing such that the at least one diaphragm forms part of an enclosure of the at least one gas chamber.

Providing the gas chamber improves the acoustic radiation efficiency of the actuator device. In particular, radiation efficiency losses can be reduced or avoided by means of the gas chamber. For example, radiation efficiency losses at low frequencies (for example, at 500 Hz or smaller, at 400 Hz or smaller, 300 Hz or smaller, 200 Hz or smaller and/or 100 Hz or smaller) can be reduced or avoided. Generating the anti-noise signal in this low-frequency range is of particular importance for an efficient noise reduction of the blade. Thus, by providing the gas chamber, a stronger anti-noise signal can be generated.

Since the housing of the actuator device is aerodynamically shaped, the gas chamber can be accommodated in the housing without or with only little deterioration of the aerodynamic performance of the blade.

The gas chamber is, for example, a closed gas chamber. The chamber could also comprise a vent hole or alternatively a passive (non-driven) diaphragm (known as a passive radiator) for improved low frequency radiation.

The actuator device may also comprise more than one (e.g., closed) gas chamber. In particular, the housing of the actuator device may accommodate more than one (e.g., closed) gas chamber.

The at least one diaphragm comprises, for example, at opposite sides thereof a first and a second surface. Further, the first surface is, for example, exposed at the housing and the second surface forms part of an enclosure of the at least one gas chamber.

According to a further embodiment, a total volume of the at least one gas chamber is 0.03 liters or more, 0.05 liters or more, 0.1 liters or more, 0.13 liters or more, 0.15 liters or more, 0.2 liters or more and/or 0.3 liters or more.

Having the aerodynamically shaped housing of the actuator device allows to accommodate a gas chamber with a large volume without or with only little deterioration of the aerodynamic performance of the blade. Further, a large volume gas chamber provides improved acoustic radiation efficiency.

In a case in which the actuator device comprises multiple gas chambers, said total volume (i.e. the "total volume of the at least one gas chamber") is the total volume of the multiple gas chambers. In other words, in case of an actuator device with multiple gas chambers, said total volume is the sum of the volumes of the individual gas chambers.

In embodiments, the actuator device comprises multiple gas chambers, and a volume of each of the multiple gas chambers is 0.03 liters or more, 0.05 liters or more, 0.1 liters or more, 0.13 liters or more, 0.15 liters or more, 0.2 liters or more and/or 0.3 liters or more.

According to a further embodiment, the aerodynamically shaped housing has an aerodynamically shaped cross-section and/or an airfoil with a first side and a second side connected with each other at a leading edge and a trailing edge.

For example, a fluid flow impacts the aerodynamically shaped housing at the leading edge of the housing. The fluid flow is then divided at the leading edge of the housing such that a portion of the flow is guided along the first side of the housing to the trailing edge of the housing and another portion of the flow is guided along the second side of the housing to the trailing edge of the housing.

An airfoil of the aerodynamically shaped housing is, for example, a symmetric airfoil. In particular, the first and second sides of the housing airfoil are, for example, symmetric to each other with respect to a line connecting the leading and trailing edges of the housing airfoil.

According to a further embodiment, the blade with the aerodynamically shaped housing is configured such that a fluid flow approaching the housing from a leading edge of the blade is flowing from the leading edge of the housing to the trailing edge of the housing.

The fluid flow (e.g., air flow) approaching the housing from the leading edge of the blade is, in particular, guided from the leading edge of the blade along the blade surface to the leading edge of the housing. Thus, the fluid flow is meeting the housing at its leading edge.

Depending on the attachment location of the housing on the blade of either on the suction side or the pressure side of the blade, the fluid flow is guided towards the housing either along the suction side or the pressure side of the blade, respectively:

When the housing is, for example, attached to the blade's suction side, the fluid flow approaching the housing from the leading edge of the blade is guided from the leading edge of the blade along the suction side of the blade to the leading edge of the housing.

When the housing is, for example, attached to the blade's pressure side, the fluid flow approaching the housing from the leading edge of the blade is guided from the leading edge of the blade along the pressure side of the blade to the leading edge of the housing.

The phrase "the blade with the aerodynamically shaped housing being configured such that . . . " used herein means, for example, that "an outer shape of the housing is configured and the housing is arranged (e.g., in an orientation) on the outer surface of the blade such that . . . ".

According to a further embodiment, the housing is arranged on one of a suction side and a pressure side of the blade. Further, the blade with the housing is configured such that the fluid flow approaching the housing from the leading edge of the blade is divided at the leading edge of the housing such that:
  a portion of the fluid flow is flowing from the leading edge of the housing along the one of the suction side and the pressure side of the blade and along the first side of the housing to the trailing edge of the housing, and
  a further portion of the fluid flow is flowing from the leading edge of the housing along the one of the suction side and the pressure side of the blade and along the second side of the housing to the trailing edge of the housing.

According to a further embodiment,
  the housing is arranged on one of a suction side and a pressure side of the blade, and
  the leading edge of the housing is arranged upstream and the trailing edge of the housing is arranged downstream both with respect to a fluid flow along the one of the suction side and the pressure side of the blade.

When the housing is, for example, arranged on the suction side of the blade, the leading edge of the housing is arranged upstream and the trailing edge of the housing is arranged downstream both with respect to a fluid flow along the suction side of the blade. Corresponding considerations apply for an attachment of the housing on the pressure side of the blade.

According to a further embodiment, the housing is attached to an attachment surface of the blade, and the housing has an aerodynamically shaped cross-section in a plane being arranged parallel to the attachment surface of the blade and/or parallel to a tangent to the attachment surface of the blade.

For example, a size of the attachment surface of the blade corresponds to and/or is equal to a size of a footprint of the housing. The footprint of the housing is, in particular, a size of an area on the blade surface covered by the housing.

The attachment surface is, for example, substantially flat. In this case, the housing has an aerodynamically shaped cross-section in a plane arranged parallel to the attachment surface of the blade.

The attachment surface may, for example, also have a curvature and/or non-flat structure. In this case, the housing has an aerodynamically shaped cross-section in a plane arranged parallel to a tangent (e.g., tangent plane) to the curved attachment surface of the blade.

According to a further embodiment, the housing has rounded edges at an outer surface thereof.

The rounded edges are, for example, convexly shaped edges.

The housing has, for example, rounded (e.g., convexly shaped) edges (e.g., only) at an outer surface thereof facing away from the blade's surface and/or said attachment surface.

According to a further embodiment, the housing is, as seen in cross-section taken parallel to an airfoil of the blade, tapered towards a leading edge and/or towards a trailing edge of the blade.

Here, "towards the leading edge and/or towards the trailing edge of the blade" is to be understood as "towards the leading edge and/or towards the trailing edge of the blade with respect to a flow direction" and/or as "towards the leading edge along the blade's surface and/or towards the trailing edge of the blade along the blade's surface".

For example, the housing may be tapered towards the leading edge and/or towards the trailing edge of the blade in one or more tapered regions of the housing such that the housing has a concavely shaped portion in the tapered region. For example, the outer surface of the housing, may, for example, smoothly converge towards the surface of the blade.

According to a further embodiment, the housing of the actuator device is attached at one of the suction side and the pressure side of the blade such that a distance between the housing and the trailing edge of the blade is shorter than a distance between the housing and the leading edge of the blade.

The trailing edge noise radiation of the blade (e.g., of the blade's airfoil) is concentrated toward the trailing edge of the blade/airfoil (the source location). Thus, by arranging the housing of the actuator device near the noise source the device is intended to cancel, the trailing edge noise and anti-noise signal propagate through more similar paths towards the observer location. By this method, the noise and anti-noise signal remain more correlated with each other over that distance and noise cancellation performance is improved.

According to a further embodiment, the actuator device comprises one or more actuator units for generating the anti-noise signal, each actuator unit includes a diaphragm for converting kinetic energy into acoustic energy, and the one or more actuator units are at least partially accommodated inside the housing.

The actuator device comprises, for example, two, three or four actuator units for generating the anti-noise signal.

According to a further embodiment, the actuator device comprises multiple actuator units and multiple gas chambers, each gas chamber being associated with a corresponding actuator unit such that a diaphragm of a respective actuator unit forms part of an enclosure of a respective associated gas chamber.

Having multiple actuator units, the control unit can generate and send different signals to different actuator units to produce optimal noise cancellation at one or more observer locations. Further, by each actuator unit having its own gas chambers, cross talk between the actuator units can be reduced. In particular, since a speaker radiates forward and backward, if two actuator units (speakers) shared the same gas chamber, there would be cross talk between the actuator units. For example, a first actuator unit (speaker) would also radiate through the gas chamber of a second actuator unit (speaker).

According to a further embodiment, the actuator device comprises multiple actuator units arranged chordwise with respect to a chord line of the blade airfoil and/or with respect to a chord line of the housing airfoil.

A chordwise arrangement with respect to the chord line of the blade airfoil means, in particular, an arrangement of the multiple actuator units parallel to a direction pointing with respect to the flow direction (along the surface of the blade) from the leading edge of the blade to the trialing edge of the blade.

According to a further aspect, a wind turbine is provided. The wind turbine comprises one or more of the above-described wind turbine blades.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION

Further embodiments, features and advantages of the present invention will become apparent from the subsequent description and dependent claims, taken in conjunction with the accompanying drawings, in which:

In the Figures, like reference numerals designate like or functionally equivalent elements, unless otherwise indicated.

DETAILED DESCRIPTION

Figure 1:
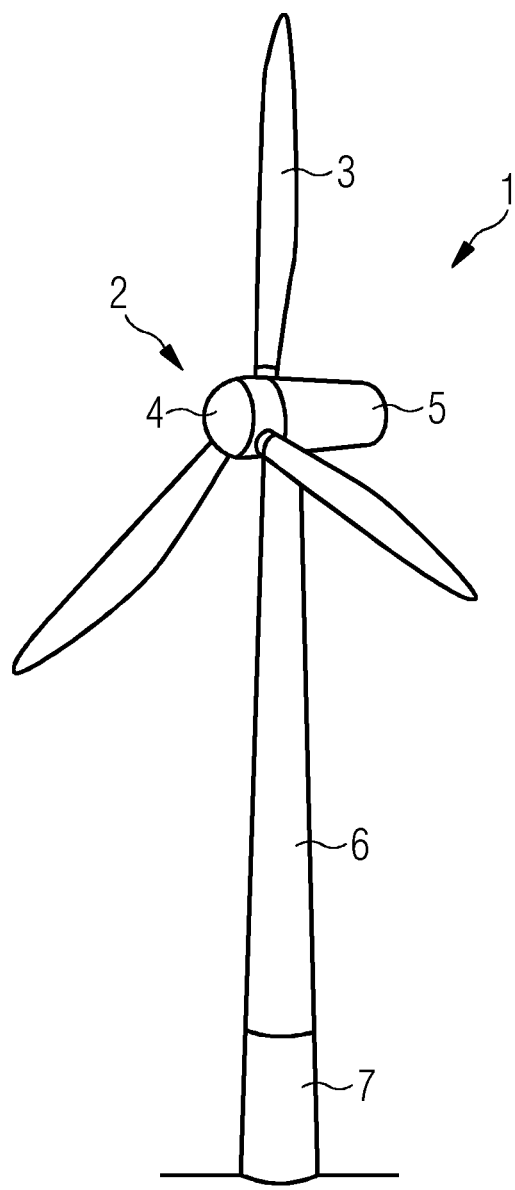
FIG. 1 shows a wind turbine according to an embodiment.

FIG. 1 shows a wind turbine 1 according to an embodiment. The wind turbine 1 comprises a rotor 2 having one or more blades 3 connected to a hub 4. The hub 4 is connected to a generator (not shown) arranged inside a nacelle 5. During operation of the wind turbine 1, the blades 3 are driven by wind to rotate and the wind's kinetic energy is converted into electrical energy by the generator in the nacelle 5. The nacelle 5 is arranged at the upper end of a tower 6 of the wind turbine 1. The tower 6 is erected on a foundation 7 such as a monopile or concrete foundation. The foundation 7 is connected to and/or driven into the ground or seabed.

Figure 2:
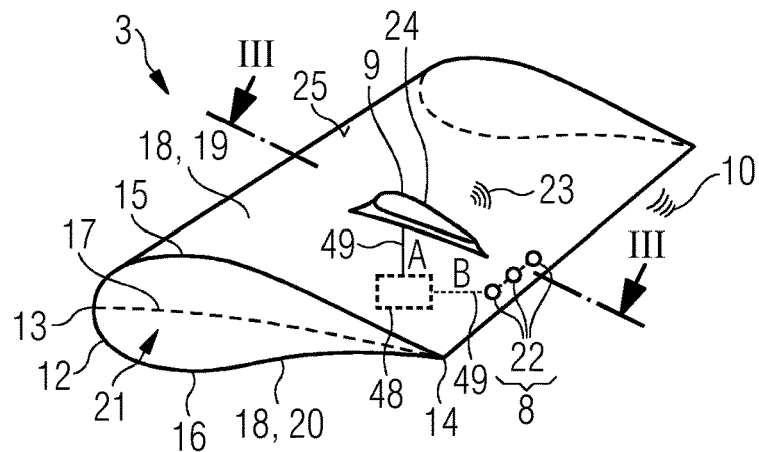
FIG. 2 shows a partial perspective view of a blade of the wind turbine of FIG. 1 according to an embodiment.

FIG. 2 shows a partial perspective view of a blade 3 of the wind turbine 1 of FIG. 1 according to an embodiment.

The blade 3 comprises a sensor device 8 and an actuator device 9 for active-noise cancellation of flow-induced noise 10 produced by the blade 3. The main noise source of a blade 3 is so-called trailing edge noise 10 generated at a trailing edge 14 of the blade 3.

As shown in FIG. 2, the blade 3 comprises an aerodynamically shaped cross-section profile (blade airfoil 12). The blade airfoil 12 includes a leading edge 13 and a trailing edge 14. Furthermore, the blade airfoil 12 includes a suction side 15 and a pressure side 16 connected with each by the leading and trailing edges 13, 14. A chord line 17 of the blade airfoil 12 is connecting the leading edge 13 with the trailing edge 14.

Further, the blade 3 comprises a shell 18. The shell 18 is, for example, made from fiber-reinforced resin.

The shell 18 comprises a suction side shell 19 and a pressure side shell 20. The suction and pressured side shells 19, 20 are surrounding an inner cavity 21 of the blade 3.

The sensor device 8 is configured for detecting properties (e.g., characteristics) of the flow-induced noise 10 produced by the blade 3. The sensor device 8 comprises, for example, several sensor units 22 for detecting the properties of the flow-induced noise 10. As an example, in FIG. 2 three sensor units 22 are shown. However, the sensor device 8 may also include more or less than three sensor units 22.

The sensor device 8 and/or each sensor unit 22 comprises, for example, a microphone for detecting the properties of the noise 10. However, the sensor device 8 and/or each sensor unit 22 may also comprise other means for detecting the properties of the noise 10.

The actuator device 9 is configured for emitting an anti-noise signal 23. The anti-noise signal 23 is generated by the actuator device 9 for, at least partially, cancelling out the flow-induced noise 10.

The actuator device 9 comprises, for example, one or more loudspeaker or other means for generating the anti-noise signal 23.

The actuator device 9 has an aerodynamically shaped housing 24 attached to an outer surface 25 of the blade 3. In the example of FIG. 2, the housing 24 of the actuator device 9 is attached to the outer surface 25 of the suction side shell 19 of the blade 3. While not shown in the figures, in other examples, the housing 24 of the actuator device 9 may also be attached to an outer surface 26 (FIG. 3) of the pressure side shell 20 of the blade 3.

Figure 3:
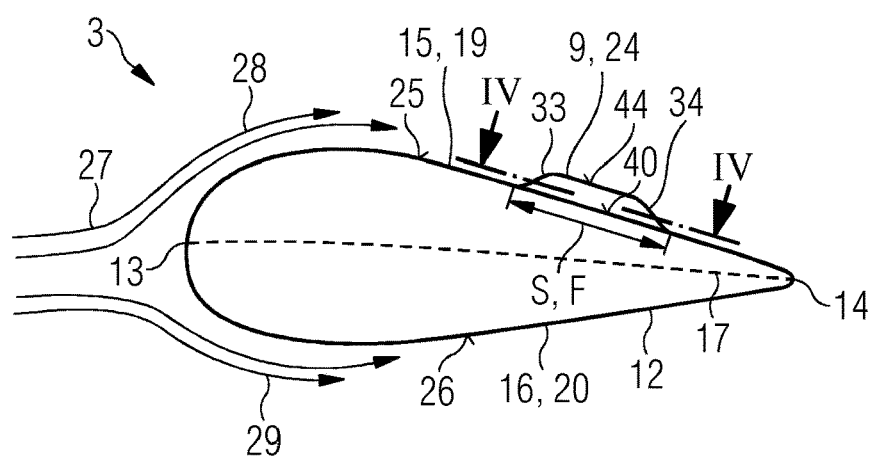
FIG. 3 shows the blade of FIG. 2 and a housing of an actuator device attached to a surface of the blade in a cross-section view along line III-III in FIG. 2.

FIG. 3 shows the blade 3 of FIG. 2 in cross-section, with the cross-section taken along line III-III in FIG. 2.

In FIG. 3, a fluid flow 27 (e.g., air flow 27) along the surfaces 25, 26 of the blade 3 is illustrated. The fluid flow 27 is separated at the leading edge 13 of the blade into two portions 28, 29. A first portion 28 of the fluid flow 27 is guided along the suction side 15 of the blade 3 to the trailing edge 14 of the blade 3. A second portion 29 of the fluid flow 27 is guided along the pressure side 16 of the blade 3 to the trailing edge 14 of the blade 3.

Figure 7:
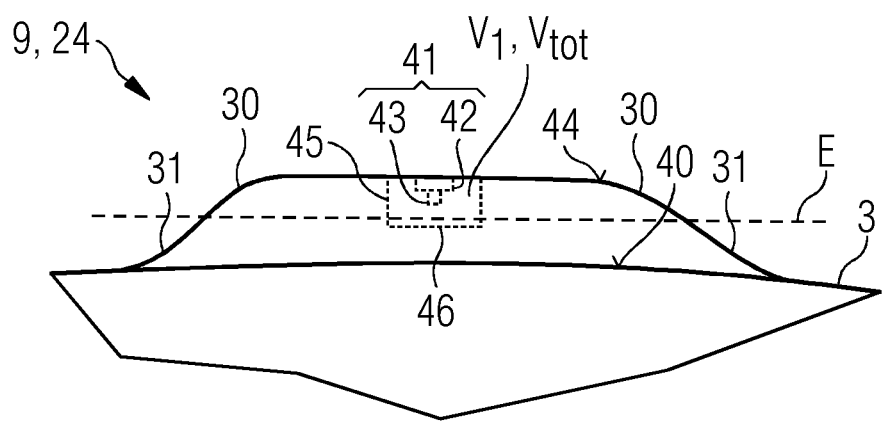
FIG. 7 shows an enlarged view of the housing of the actuator device of FIG. 3, wherein the actuator device comprises one actuator unit and one gas chamber.

FIG. 3 shows in addition a cross-section view of the housing 24 of the actuator device 9. The housing 24 has rounded edges 30 (FIG. 7). Further, the housing 24 has tapered portions 31 (FIG. 7) tapered in a direction towards the leading edge 13 and in a direction towards the trailing edge 14 of the blade 3 (said directions are directions with respect to a flow path of the flow 28 along the surface 25 of the blade 3).

Figure 4:
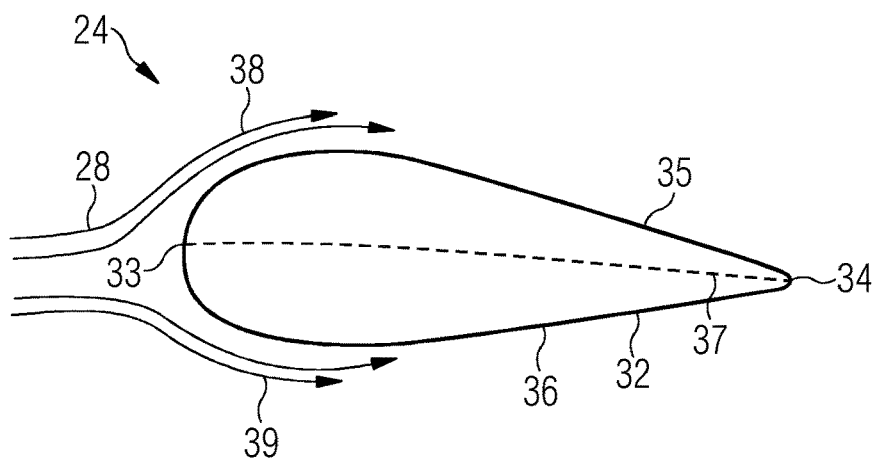
FIG. 4 shows a cross-section view of the housing along line IV-IV in FIG. 3.

FIG. 4 shows a cross-section of the aerodynamically shaped housing 24 of the actuator device 9. The cross-section is taken along line IV-IV in FIG. 3. As can be seen in FIG. 4, the housing 24 has an airfoil 32 (e.g., a symmetric airfoil 32) with a leading edge 33 and a trailing edge 34. The housing airfoil 32 further comprises a first side 35 and a second side 36 connected with each other at the leading and trailing edges 33, 34 of the housing 24. A chord line 37 is connecting the leading and trailing edges 33, 34 with each other.

With respect to a fluid flow 28 along the suction side 15 (FIG. 3) of the blade 3 to which the housing 24 is attached, the leading edge 33 of the housing 24 is arranged upstream and the trailing edge 34 of the housing 24 is arranged downstream.

Due to the described configuration of the housing 24 and arrangement of the housing 24 on the blade 3, a flow 28 (FIG. 3) of fluid (e.g., air) is approaching the housing 24 from the leading edge 13 of the blade 3. Further, the fluid flow 28 is meeting the housing 24 at its leading edge 33. At the leading edge 33 of the housing 24, the fluid flow 28 is divided in two portions 38, 39. A first portion 38 of the approaching flow 28 is guided along the first side 35 of the housing 24 to the trailing edge 34 of the housing 24. A second portion 39 of the approaching flow 28 is guided along the second side 36 of the housing 24 to the trailing edge 34 of the housing 24.

In particular, the housing 24 has the aerodynamically shaped cross-section (airfoil 32, FIG. 4) in a plane E (FIG. 7) being arranged parallel to an attachment surface 40 (FIG. 3) of the blade 3. The attachment surface 40 of the blade 3 is, in particular, a surface of the blade 3 to which the housing 24 is attached. In the shown example, the attachment surface 40 is a portion of the suction side surface 25 of the blade 3 (in other examples, it can also be a portion of the pressure side surface 26 of the blade 3). A size S of the attachment surface 40 is, in particular, equal to a footprint F of the housing 24.

Figure 5:
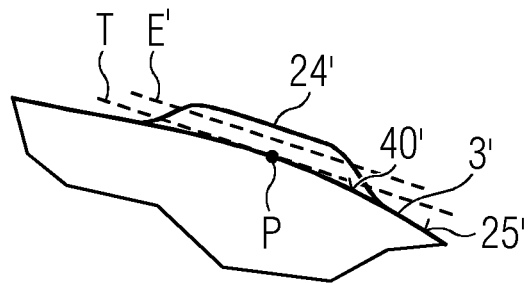
FIG. 5 shows a view of a portion of a surface of a blade and a housing according to a further embodiment.

In case of a non-flat attachment surface 40' (FIG. 5) of the blade 3', the housing 24' may have the aerodynamically shaped cross-section (airfoil 32, FIG. 4) in a plane E being arranged parallel to a tangent plane T to the attachment surface 40' of the blade 3'. The tangent plane T is, in particular, based on a tangent T to the attachment surface 40' in the point P, as seen in the cross-section view of FIG. 5.

Figure 6:
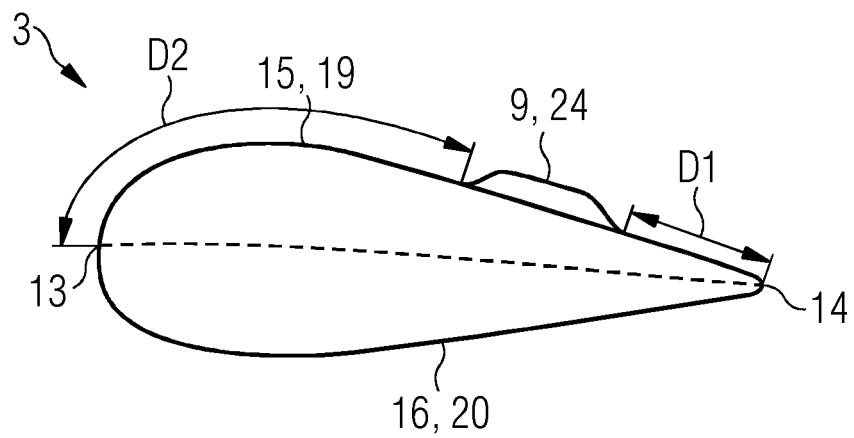
FIG. 6 shows a view similar as FIG. 3, wherein distances of the housing to a leading edge and a trailing edge of the blade are illustrated.

As illustrated in FIG. 6, the housing 24 of the actuator device 9 may be attached at the suction side 15 (suction side shell 19) of the blade 3 such that a distance D1 between the housing 24 and the trailing edge 14 of the blade 3 is shorter than a distance D2 between the housing 24 and the leading edge 13 of the blade 3. The distances D1, D2 are distances with respect to a flow path of the respective fluid flow 28 (or 29).

FIG. 7 displays an enlarged view of the housing 24 of the actuator device 9 of FIG. 3. As shown, the actuator device 9 comprises one or more actuator units 41 for generating the anti-noise signal 23 (FIG. 2). The actuator unit(s) 41 is/are at least partially accommodated inside the housing 24. Each actuator unit 41 includes a diaphragm 42 for converting kinetic energy into acoustic energy. The diaphragm 42 is exposed at an outer surface 44 of the housing 24.

Further, each actuator unit 41 includes a driving unit 43 for driving a movement of the diaphragm 41 such that a sound wave and/or pressure wave can be generated by the moving diaphragm 42.

Moreover, as shown in FIG. 7, the actuator device 9 may further comprise at least one (e.g., closed) gas chamber 45 accommodated inside the housing 24. In particular, the diaphragm 42 forms part of an enclosure 46 of the gas chamber 45.

In FIG. 7, an example of an actuator device 9 with one actuator unit 41 and one gas chamber 45 is shown. However, an actuator device 9', 9" may also comprise more than one actuator unit 41 and/or more than one gas chamber 45, as illustrated in FIGS. 8 and 9.

Figure 8:
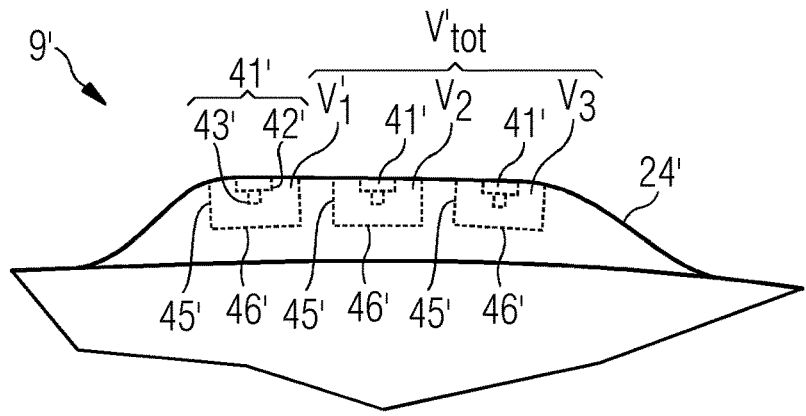
FIG. 8 shows a view similar as FIG. 7 but for another embodiment of the actuator device in which the actuator device comprises three actuator units and three gas chambers.

FIG. 8 shows an example of an actuator device 9' with three actuator units 41' and three gas chambers 45'. Each actuator unit 41' includes a diaphragm 42' and a driving unit 43'.

Furthermore, each gas chamber 45' is associated with one (single) corresponding actuator unit 41' such that a diaphragm 42' of a respective actuator unit 41' forms part of an enclosure 46' of a respective associated gas chamber 45'.

Figure 9:
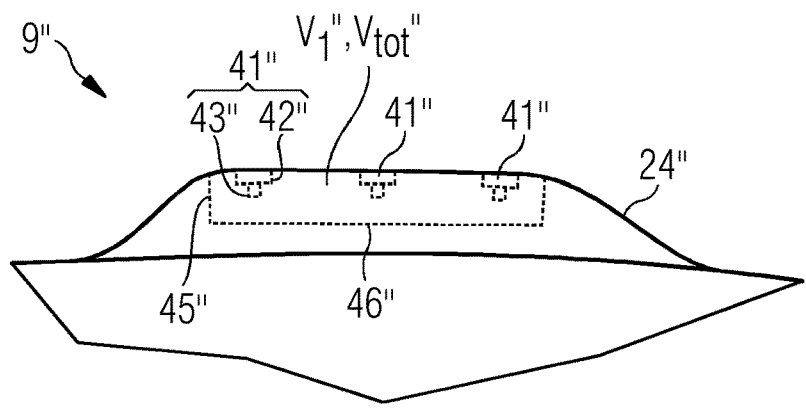
FIG. 9 shows a view similar as FIG. 7 but for another embodiment of the actuator device in which the actuator device comprises three actuator units and one gas chambers.

FIG. 9 shows an example of an actuator device 9" with three actuator units 41" and one gas chamber 45". Each actuator unit 41" includes a diaphragm 42" and a driving unit 43". For illustration purposes, only for one of the three actuator units 41", the diaphragm 42" and driving unit 43" is denoted with a reference sign. Furthermore, the one big gas chamber 45" is associated with all three actuator units 41" such that the diaphragms 42" of the actuator units 41" form part of an enclosure 46" of the one gas chamber 45".

In embodiments in which the actuator device 9', 9" comprises multiple actuator units 41', 41", the multiple actuator units 41', 41", may be arranged chordwise with respect to the chord line 17 of the blade airfoil 12 (FIG. 3) and/or with respect to the chord line 37 of the housing airfoil 32.

Having the aerodynamically shaped housing 24, 24', 24" of the actuator device 9, 9', 9" allows to accommodate one or more gas chambers 45, 45', 45" with a relatively large total volume $V_{tot}$ inside the housing 24, 24', 24" without significant deterioration of the aerodynamic performance of the blade 3, 3', 3". With a large total volume $V_{tot}$ of the gas chamber(s) 45, 45', 45" acoustic radiation losses can be reduced and acoustic radiation efficiency can be improved.

Figure 10:
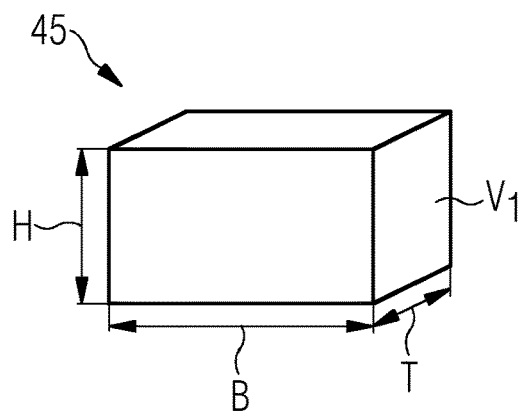
FIG. 10 illustrates a volume of a gas chamber of FIG. 7.

A volume $V_1$ of the gas chamber 45 (FIG. 7) is, for example, given by the product of its width B, height H and depth T, as shown in FIG. 10. Further, also a volume $V_1'$, $V_2$, $V_3$ of each of the three gas chambers 45' in FIG. 8 as well as a volume $V_1''$ of the gas chamber 45'' in FIG. 9 may be given as illustrated in FIG. 10.

The gas chambers 45, 45', 45'' may have a rectangular block shape (cuboid shape), as shown in FIG. 10. Further, although not shown in figures, any of the gas chambers 45, 45', 45'' may also have a different shape than rectangular block shape.

A total volume $V_{tot}=V_1$ of the gas chamber 45 (FIG. 7), a total volume $V_{tot}'=V_1'+V_2+V_3$ of the gas chamber 45' (FIG. 8) and/or a total volume $V_{tot}''=V_1''$ of the gas chamber 45'' (FIG. 9) has, for example, a value of 0.1 liters or more to provide a sufficient acoustic efficiency of the respective actuator device 9, 9', 9''.

For generating the anti-noise signal 23, the wind turbine blade 3 comprises, for example, a control unit 48 (FIG. 2) for generating a control signal A based on a sensor signal B of the sensor device 8. The sensor signal B of the sensor device 8 corresponds, in particular, to the noise 10 of the blade 3. The control unit 48 is configured to control the actuator device 9 by means of the control signal A such that the actuator device 9 emits the anti-noise signal 23. The control unit 48 is, for example, configured to generate the control signal A such that a superposition of the noise 10 and the anti-noise signal 23 leads to a destructive interference.

The actuator device 9 is, for example, connected (wired 49 or wireless) via the control unit 48 with the sensor device 22 for data transfer. The control unit 48 is, for example, arranged inside the blade 3 (i.e. in the inner cavity 21 of the blade 3).

Thus, the described active noise cancellation system (i.e. the sensor and actuator devices 8, 9 and, for example, the control unit 48) allows a significant reduction of a noise emission of the blade 3. By means of the aerodynamically shaped housing 24, this noise reduction can be realized without significantly deteriorating the aerodynamic properties of the blade 3.

Although the present invention has been described in accordance with preferred embodiments, it is obvious for the person skilled in the art that modifications are possible in all embodiments.

The invention claimed is:

1. A wind turbine blade, comprising:
a sensor device for detecting properties of flow-induced noise produced by the blade; and
an actuator device for emitting an anti-noise signal for at least partially cancelling out the flow-induced noise, wherein the actuator device includes an aerodynamically shaped housing that is a symmetric airfoil such that a first side of the housing and a second side of the housing are symmetric to each other with respect to a chord line connecting a leading edge of the housing and a trailing edge of the housing, the housing being attached at one of a suction side and a pressure side of the blade such that a distance between the housing and a trailing edge of the blade is shorter than a distance between the housing and a leading edge of the blade, at least one diaphragm, wherein a first surface of the at least one diaphragm is exposed at an outer surface of the housing for converting kinetic energy into acoustic energy for generating the anti-noise signal such that a sound wave is generated by the moving diaphragm and emitted by the actuator device, and at least one closed gas chamber accommodated inside the housing configured to increase acoustic radiation efficiency of the sound wave generated by the moving diaphragm and emitted by the actuator device such that a second surface of the at least one diaphragm forms part of an enclosure of the at least one closed gas chamber, wherein the actuator device is attached to an attachment surface of the blade and without using a hole in the blade, wherein a plurality of actuator units are located within the at least one closed gas chamber, and wherein each actuator unit of the plurality of actuator units includes a respective diaphragm for converting kinetic energy into acoustic energy, wherein the at least one gas closed gas chamber includes multiple closed and spaced apart gas chambers, each of the multiple closed and spaced apart gas chamber being associated with a corresponding actuator unit of the plurality of actuator units such that a diaphragm of a respective actuator unit forms part of an enclosure of a respective associated gas chamber;
wherein the leading edge of the housing having a tapered section that is concavely shaped in a direction of a leading edge of the blade that is adjacent to a rounded edge that leads to an outer surface of the housing, the trailing edge of the housing having a tapered section that is concavely shaped in a direction of a trailing edge of the blade that is adjacent to a rounded edge that leads to the outer surface of the housing.

2. The wind turbine blade according to claim 1, wherein a total volume of the at least one closed gas chamber is 0.03 liters or more.

3. The wind turbine blade according to claim 1, wherein a fluid flow approaching the housing from the leading edge of the blade is flowing from the leading edge of the housing to the trailing edge of the housing.

4. The wind turbine blade according to claim 3, wherein:
the airfoil of the housing divides the fluid flow approaching the housing from the leading edge of the blade at the leading edge of the housing such that:
a portion of the fluid flow is flowing from the leading edge of the housing along the one of the suction side and the pressure side of the blade and along the first side of the housing to the trailing edge of the housing, and
a further portion of the fluid flow is flowing from the leading edge of the housing along the one of the suction side and the pressure side of the blade and along the second side of the housing to the trailing edge of the housing.

5. The wind turbine blade according to claim 1, wherein:
the leading edge of the housing is arranged upstream and the trailing edge of the housing is arranged downstream both with respect to a fluid flow along the one of the suction side and the pressure side of the blade.

6. The wind turbine blade according to claim 1, wherein the airfoil is in a plane being arranged parallel to the attachment surface of the blade and/or parallel to a tangent to the attachment surface of the blade.

7. The wind turbine blade according to claim 1, wherein the housing has rounded edges at the outer surface of the housing.

8. The wind turbine blade according to claim 1, wherein the plurality of actuator units comprises multiple actuator units arranged chordwise with respect to a chord line of the blade airfoil and/or with respect to the chord line of the housing.

9. The wind turbine blade according to claim 1, wherein the aerodynamic shaped housing provides for accommodation of the multiple closed and spaced apart gas chambers without significant deterioration of the aerodynamic performance of the blade.

10. The wind turbine blade according to claim 1, wherein the multiple closed and spaced apart gas chambers includes a total volume 0.1 liters or more.

11. The wind turbine blade according to claim 1, wherein the multiple closed and spaced apart gas chambers each include a cuboid shape.

12. The wind turbine blade according to claim 1, wherein the aerodynamic shaped housing provides for accommodation of the multiple closed and spaced apart gas chambers by extending away from an aerodynamically shaped airfoil cross section of the wind turbine blade.

13. The wind turbine blade according to claim 1, further comprising a microphone unit located downstream form the actuator device configured to detect noise properties, and a control located inside the wind turbine blade configured to generate a control signal to each of the plurality of actuator units based on a sensor signal of a microphone unit.

14. A wind turbine, comprising one or more wind turbine blades according to claim 1.

15. A wind turbine blade, comprising:
a sensor device for detecting properties of flow-induced noise produced by the blade; and
an actuator device for emitting an anti-noise signal for at least partially cancelling out the flow-induced noise, wherein the actuator device includes an aerodynamically shaped housing that is a symmetric airfoil such that a first side of the housing and a second side of the housing are symmetric to each other with respect to a chord line connecting a leading edge of the housing and a trailing edge of the housing, the housing being attached at one of a suction side and a pressure side of the blade such that a distance between the housing and a trailing edge of the blade is shorter than a distance between the housing and a leading edge of the blade, at least one diaphragm, wherein a first surface of the at least one diaphragm is exposed at an outer surface of the housing for converting kinetic energy into acoustic energy for generating the anti-noise signal such that a sound wave is generated by the moving diaphragm and emitted by the actuator device, and at least one closed gas chamber accommodated inside the housing configured to increase acoustic radiation efficiency of the sound wave generated by the moving diaphragm and emitted by the actuator device such that a second surface of the at least one diaphragm forms part of an enclosure of the at least one closed gas chamber, wherein the actuator device is attached to an attachment surface of the blade and without using a hole in the blade;
wherein the leading edge of the housing having a tapered section that is concavely shaped in a direction of a leading edge of the blade that is adjacent to a rounded edge that leads to an outer surface of the housing, the trailing edge of the housing having a tapered section that is concavely shaped in a direction of a trailing edge of the blade that is adjacent to a rounded edge that leads to the outer surface of the housing.

16. A wind turbine blade, comprising:
a sensor device for detecting properties of flow-induced noise produced by the blade; and
an actuator device for emitting an anti-noise signal for at least partially cancelling out the flow-induced noise, wherein the actuator device includes an aerodynamically shaped housing that is a symmetric airfoil such that a first side of the housing and a second side of the housing are symmetric to each other with respect to a chord line connecting a leading edge of the housing and a trailing edge of the housing, the housing being attached at one of a suction side and a pressure side of the blade such that a distance between the housing and a trailing edge of the blade is shorter than a distance between the housing and a leading edge of the blade, at least one diaphragm, wherein a first surface of the at least one diaphragm is exposed at an outer surface of the housing for converting kinetic energy into acoustic energy for generating the anti-noise signal, and at least one closed gas chamber accommodated inside the housing such that a second surface of the at least one diaphragm forms part of an enclosure of the at least one closed gas chamber, wherein the actuator device is attached to an attachment surface of the blade and without using a hole in the blade;
wherein the leading edge of the housing having a tapered section that is concavely shaped in a direction of a leading edge of the blade that is adjacent to a rounded edge that leads to an outer surface of the housing, the trailing edge of the housing having a tapered section that is concavely shaped in a direction of a trailing edge of the blade that is adjacent to a rounded edge that leads to the outer surface of the housing.

* * * * *